United States Patent
Lee

(10) Patent No.: US 9,479,014 B2
(45) Date of Patent: Oct. 25, 2016

(54) SYSTEM AND METHOD FOR A PROGRAMMABLE ELECTRIC CONVERTER

(71) Applicant: Randal A. Lee, Marble Falls, TX (US)

(72) Inventor: Randal A. Lee, Marble Falls, TX (US)

(73) Assignee: Acme Product Development, Ltd., Marble Falls, TX (US)

( * ) Notice: Subject to any disclaimer, the term of this patent is extended or adjusted under 35 U.S.C. 154(b) by 395 days.

(21) Appl. No.: 13/842,953

(22) Filed: Mar. 15, 2013

(65) Prior Publication Data

US 2014/0265988 A1 Sep. 18, 2014

Related U.S. Application Data

(60) Provisional application No. 61/617,018, filed on Mar. 28, 2012.

(51) Int. Cl.
| | |
|---|---|
| H02P 1/00 | (2006.01) |
| H02P 3/00 | (2006.01) |
| H02K 31/00 | (2006.01) |
| H02M 5/45 | (2006.01) |

(Continued)

(52) U.S. Cl.
CPC .................. *H02K 1/00* (2013.01); *H02K 11/33* (2016.01); *H02K 19/106* (2013.01); *H02K 21/046* (2013.01); *H02K 21/48* (2013.01); *H02K 47/00* (2013.01); *H02K 57/00* (2013.01); *H02K 2213/09* (2013.01); *H02K 2213/12* (2013.01)

(58) Field of Classification Search
CPC .................................. H02K 3/28; H02K 1/17
USPC ........ 318/244, 495, 245, 251, 252; 310/208; 290/55
See application file for complete search history.

(56) References Cited

U.S. PATENT DOCUMENTS

| | | |
|---|---|---|
| 3,308,318 A | 3/1967 | Dunaiski et al. |
| 4,087,711 A | 5/1978 | Kirtley, Jr. et al. |

(Continued)

FOREIGN PATENT DOCUMENTS

WO WO-2009/056879 A1 5/2009

OTHER PUBLICATIONS

Copenheaver, Blaine R., "International Search Report" prepared for PCT/US2013/034495 as mailed Jul. 5, 2013, 4 pages.

*Primary Examiner* — Paul Ip
*Assistant Examiner* — Devon Joseph
(74) *Attorney, Agent, or Firm* — Winstead PC

(57) ABSTRACT

An electric converter is provided which uses independently controlled field coils to impress a temporary magnetic field on a rotor movable relative to one or more armatures. In some embodiments, the rotor of the programmable electric converter is rotatable with the axis of rotation being on a horizontal or vertical axis. In various embodiments, the electric converter disclosed herein may be adapted for use as a continuous power solution to provide power for a limited period of time in the event of a power outage by absorbing energy and storing it mechanically in the rotor. In some embodiments, the electric converter may be utilized as a generator. In some embodiments, both AC and DC could be simultaneously produced, where AC is generated in one armature coil and DC in another coil. In some embodiments, the programmable electric converter can operate as an AC to AC converter, AC to DC converter, DC to AC converter, or DC to DC converter. In some embodiments, the electromagnetic converter may be utilized to provide electromagnetic propulsion to provide precise acceleration profiles and capture regenerative braking energy.

18 Claims, 16 Drawing Sheets

(51) Int. Cl.
  *H02K 1/00* (2006.01)
  *H02K 19/10* (2006.01)
  *H02K 21/04* (2006.01)
  *H02K 21/48* (2006.01)
  *H02K 47/00* (2006.01)
  *H02K 99/00* (2014.01)

(56) References Cited

U.S. PATENT DOCUMENTS

| | | | |
|---|---|---|---|
| 4,227,136 A | 10/1980 | Roesel, Jr. | |
| 4,233,548 A * | 11/1980 | Kirtley, Jr. | H02P 6/00 318/400.01 |
| 4,467,267 A | 8/1984 | Hucker et al. | |
| 4,524,316 A * | 6/1985 | Brown | B60L 11/08 318/727 |
| 4,603,283 A * | 7/1986 | Oltendorf | H02P 6/182 318/400.2 |
| 4,692,675 A * | 9/1987 | Falk | H02P 6/14 318/400.01 |
| 4,900,993 A * | 2/1990 | Yasohara | H02P 6/182 318/400.04 |
| 4,992,920 A * | 2/1991 | Davis | 363/36 |
| 5,023,527 A * | 6/1991 | Erdman | F23N 3/082 318/400.03 |
| 5,034,675 A * | 7/1991 | Nerowski | H02P 25/022 318/808 |
| 5,469,033 A * | 11/1995 | Huang | H02P 6/185 318/400.01 |
| 5,481,143 A * | 1/1996 | Burdick | H02K 1/148 310/216.079 |
| 5,489,842 A * | 2/1996 | Lippmann | G01D 5/2046 324/144 |
| 5,491,397 A * | 2/1996 | Hirakawa | 318/696 |
| 5,610,492 A | 3/1997 | Leung et al. | |
| 5,633,545 A * | 5/1997 | Albrecht | H02K 1/148 310/156.26 |
| 5,661,379 A * | 8/1997 | Johnson | H02K 3/28 318/139 |
| 5,786,646 A * | 7/1998 | Newberg | F16D 1/072 310/68 B |
| 5,786,673 A * | 7/1998 | Johnson | H02K 3/28 318/139 |
| 5,818,133 A * | 10/1998 | Kershaw | F16C 21/00 310/64 |
| 5,986,418 A * | 11/1999 | Horst et al. | 318/400.23 |
| 5,990,590 A | 11/1999 | Roesel, Jr. et al. | |
| 6,104,112 A * | 8/2000 | Vanjani | H02K 11/33 310/64 |
| 6,106,985 A * | 8/2000 | Yamasaki | G03G 5/0612 430/58.15 |
| 6,121,705 A | 9/2000 | Hoong | |
| 6,140,795 A * | 10/2000 | Cummins | H02P 25/04 318/135 |
| 6,166,472 A * | 12/2000 | Pinkerton et al. | 310/208 |
| 6,232,691 B1 | 5/2001 | Anderson | |
| 6,232,731 B1 * | 5/2001 | Chapman | H02M 7/49 318/400.39 |
| 6,323,573 B1 * | 11/2001 | Pinkerton | 310/178 |
| 6,351,095 B1 * | 2/2002 | Edelson | H02K 3/28 318/801 |
| 6,356,005 B1 * | 3/2002 | Hsu | H02K 1/146 310/254.1 |
| 6,392,371 B1 * | 5/2002 | Cheng et al. | 318/158 |
| 6,552,464 B1 * | 4/2003 | Rahbar | F04D 29/582 310/238 |
| 6,570,361 B1 * | 5/2003 | Edelson | H02K 3/28 318/801 |
| 6,573,632 B2 * | 6/2003 | Hsu | H02K 1/148 310/194 |
| 6,614,202 B2 * | 9/2003 | Edelson | H02P 27/02 318/727 |
| 6,657,320 B1 | 12/2003 | Andrews et al. | |
| 6,727,668 B1 * | 4/2004 | Maslov | H02P 23/0004 310/254.1 |
| 6,794,839 B1 * | 9/2004 | Maslov | H02P 27/06 310/216.001 |
| 6,806,615 B2 * | 10/2004 | Enomoto | H02K 1/148 310/216.096 |
| 6,844,707 B1 * | 1/2005 | Raad | 322/29 |
| 6,856,065 B2 * | 2/2005 | Suzuki | H02K 1/185 310/216.074 |
| 6,864,661 B2 * | 3/2005 | Edelson | H02K 3/28 318/803 |
| 6,876,118 B2 * | 4/2005 | Enomoto | H02K 1/187 310/180 |
| 6,919,700 B2 * | 7/2005 | Maslov | H02P 25/08 310/216.001 |
| 6,922,037 B2 * | 7/2005 | Edelson | H02K 3/28 318/290 |
| 6,940,242 B1 * | 9/2005 | Maslov | H02P 27/06 310/216.001 |
| 7,064,503 B2 * | 6/2006 | Marx | H02P 6/10 290/17 |
| 7,075,265 B2 * | 7/2006 | Edelson | H02K 3/28 318/737 |
| 7,111,522 B2 * | 9/2006 | Wingett | H02K 7/025 310/89 |
| 7,188,533 B2 * | 3/2007 | Pattok | G01L 3/101 73/799 |
| 7,204,011 B2 * | 4/2007 | Maslov | B60L 8/00 29/592.1 |
| 7,327,105 B2 * | 2/2008 | Edelson | H02K 3/28 310/179 |
| 7,576,507 B2 * | 8/2009 | McVickers | H01M 8/18 310/179 |
| 7,615,907 B2 * | 11/2009 | Fei | H02K 1/148 310/216.114 |
| 7,659,680 B1 * | 2/2010 | McVickers | B60T 1/10 310/179 |
| 7,772,729 B2 * | 8/2010 | Adra | H02K 3/28 310/68 B |
| 7,839,049 B2 * | 11/2010 | Jansen | H02K 1/14 310/194 |
| 7,902,715 B2 | 3/2011 | Kim et al. | |
| 1,014,823 A1 | 6/2011 | Goodzeit et al. | |
| 8,063,598 B2 * | 11/2011 | Stoiber | H02K 29/12 310/156.74 |
| 8,151,914 B2 * | 4/2012 | Horie | B60L 11/1874 180/65.1 |
| 8,222,786 B2 * | 7/2012 | Calley et al. | 310/156.02 |
| 8,421,368 B2 * | 4/2013 | Jalbout | H05B 33/0815 315/291 |
| 8,423,214 B2 * | 4/2013 | Kshatriya | B60K 6/485 180/65.1 |
| 8,596,391 B2 * | 12/2013 | Kshatriya | B60K 1/00 180/65.1 |
| 8,604,709 B2 * | 12/2013 | Jalbout | H02M 3/157 315/291 |
| 8,606,443 B2 * | 12/2013 | Pandit | B60K 6/485 180/65.1 |
| 8,630,095 B2 * | 1/2014 | Minato | H01L 21/561 180/444 |
| 8,796,969 B2 * | 8/2014 | Goetz | H02P 27/08 318/400.23 |
| 8,896,189 B2 * | 11/2014 | Ikuta | H02K 1/185 310/400 |
| 8,903,577 B2 * | 12/2014 | Jalbout | B60K 28/16 180/65.285 |
| 8,944,801 B2 * | 2/2015 | Heymanns | B30B 11/228 100/155 R |
| 9,027,681 B2 * | 5/2015 | Biderman | B60B 1/003 180/220 |
| 9,139,081 B2 * | 9/2015 | Tchervenkov | H02K 21/22 |
| 9,206,016 B2 * | 12/2015 | Breidenstein | H02K 16/04 |
| 9,227,626 B2 * | 1/2016 | Pandit | B60K 1/00 |
| 2002/0070694 A1 * | 6/2002 | Blum | H02K 29/06 318/244 |
| 2003/0057782 A1 * | 3/2003 | Kusase | 310/68 D |
| 2003/0193250 A1 * | 10/2003 | Maslov | H02K 1/141 310/68 R |
| 2007/0130950 A1 * | 6/2007 | Serkh et al. | 60/698 |

(56) References Cited

U.S. PATENT DOCUMENTS

2009/0045691 A1* 2/2009 Ichiyama ............... H02K 1/274 310/181
2010/0156205 A1* 6/2010 Davis ................... H02K 11/048 310/46
2010/0308674 A1 12/2010 Kasaoka et al.
2012/0256422 A1* 10/2012 Fradella ......................... 290/55

* cited by examiner

SYSTEM AND METHOD FOR A PROGRAMMABLE ELECTRIC CONVERTER

CROSS-REFERENCE TO RELATED APPLICATIONS

This patent application claims priority to U.S. Provisional Patent Application Ser. No. 61/617,018, filed Mar. 28, 2012.

BACKGROUND

1. Technical Field

This invention relates in general to the field of electric converters, and more particularly, but not by way of limitation to a programmable electric converter.

2. Background

Electro-magnetic machines have been used as generators or as motors or both simultaneously. The operation of the electro-magnetic machine is determined by the type of energy used to drive the machine and the type of energy which is obtained from the operation of the machine. For example, if electrical energy is delivered to the machine and mechanical energy is removed from the machine, then the machine will operate as a motor. Likewise, if mechanical energy is delivered to the machine and electrical energy is removed from the machine, then the machine will act as a generator. In some cases the machine may act both as a motor and as a generator, such as by delivering electrical energy to the machine and removing both electrical energy and mechanical energy therefrom.

In general, electro-magnetic machines usually comprise a rotor and stator, with one or both of such components having electrically induced magnetic poles. The magnetic flux lines emanating from the magnetic poles serve either to energize the rotational movement or to induce an electrical current in conductors provided adjacent thereto. Such electro-magnetic devices include generally stationary and C-shaped magnets which are arranged about the circumference of a circle and having a plurality of coils arranged around the circumference of a circle which communicates through the openings in the C-shaped magnets.

If mechanical energy, such as an external torque force, is applied to the central shaft for rotating the coils through the permanent magnets, then the machine operates as a generator. When operated in a generator mode, the external torque source forces rotation of the shaft (and thus the rotor and the magnets), and the interaction of the magnets and the windings causes a magnetic flux to loop the windings in the slots. As the rotor rotates, the magnetic flux in the stator structure changes, and this changing flux results in generation of voltage in the windings, which results in an output current that can be used to power electrical devices, or be stored for later use. When operated in a motor mode, a voltage from an external source is applied to the stator windings, which causes current flow in the windings and results in a magnetic flux to be set up in the magnetic circuit formed by the teeth and back iron. When current is supplied in an appropriate manner to the windings, the rotor can be made to rotate and thus produce usable torque. The operation of such machines is thus well understood.

Prior art electro-magnetic machines suffer from a variety of limitations which have limited their usefulness somewhat. For example, the frequency and voltage of a permanent magnet electro-magnetic machine operating as a generator may only be varied by varying the rotor speed, which limits the usefulness of such a generator in circumstances where the rotor rotation speed cannot be independently controlled.

Commutator-type motors do not operate well on high-frequency AC because the rapid changes of current are opposed by the inductance of the motor field. Although commutator-type universal motors are common in 50 Hz and 60 Hz household appliances, they are often small motors, less than 1 kW. The induction motor was found to work well on frequencies around 50 to 60 Hz but not as well at a frequency of, say, 133 Hz. There is a fixed relationship between the number of magnetic poles in the induction motor field, the frequency of the alternating current, and the rotation speed; so, a given standard speed limits the choice of frequency (and the reverse).

Generators operated by slow-speed reciprocating engines will produce lower frequencies, for a given number of poles, than those operated by, for example, a high-speed steam turbine. For very slow prime mover speeds, it would be costly to build a generator with enough poles to provide a high AC frequency. As well, synchronizing two generators to the same speed was found to be easier at lower speeds. While belt drives were common as a way to increase speed of slow engines, in very large ratings (thousands of kilowatts) these were expensive, inefficient and unreliable. The steadier rotation speed of high-speed machines allowed for satisfactory operation of commutators in rotary converters. The synchronous speed N in RPM is calculated using the formula, $$N = \frac{120f}{P}$$

where f is the frequency in Hertz and P is the number of poles.

It would therefore be desirable to improve the controllability of electro-magnetic machines, generally. Accordingly, there is a need to provide an improved electro-magnetic machine which addresses these and other limitations of the prior art.

SUMMARY OF THE INVENTION

In accordance with the present invention, a system and method for a programmable electric converter is provided.

In accordance with one aspect of the present invention, an electric converter is provided which uses independently controlled field coils to impress a temporary magnetic field on a rotor movable relative to one or more armatures.

The above summary of the invention is not intended to represent each embodiment or every aspect of the present invention. Particular embodiments may include one, some, or none of the listed advantages.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
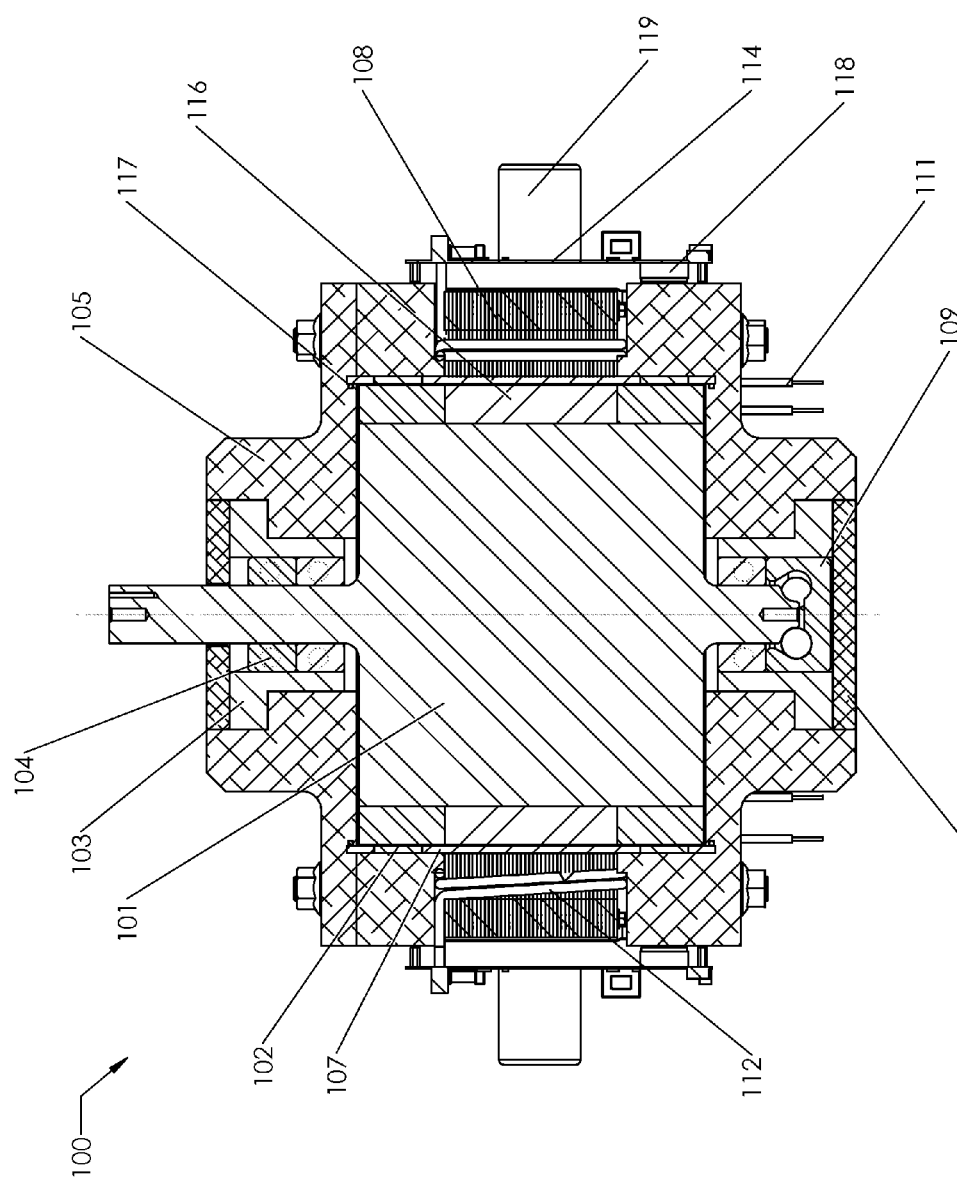
FIG. 1 illustrates a side cut-away view of one embodiment of programmable electric converter.
Figure 2:
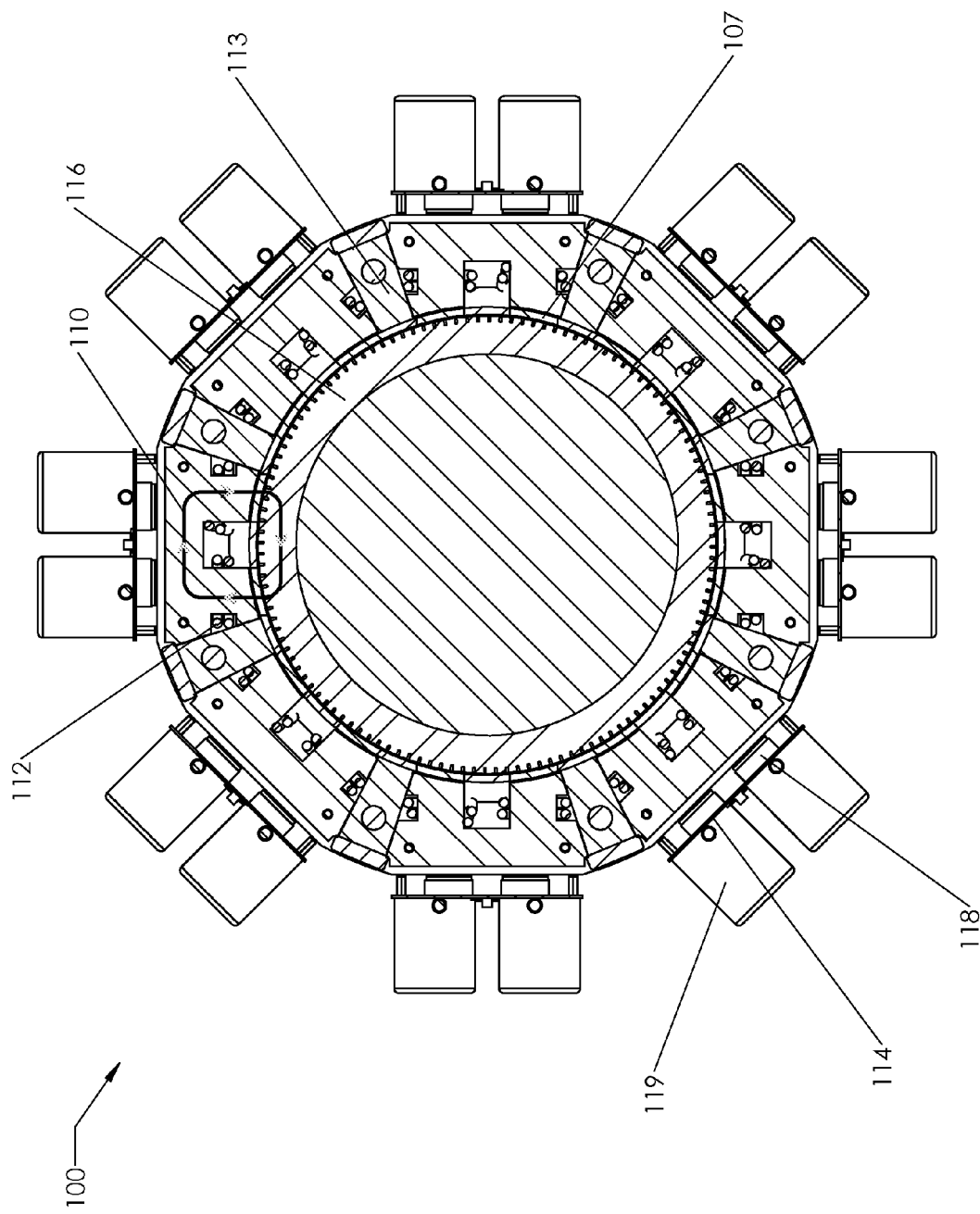
FIG. 2 illustrates a cut away view perpendicular to the axis of rotation of the programmable electric converter of FIG. 1.
Figure 3:
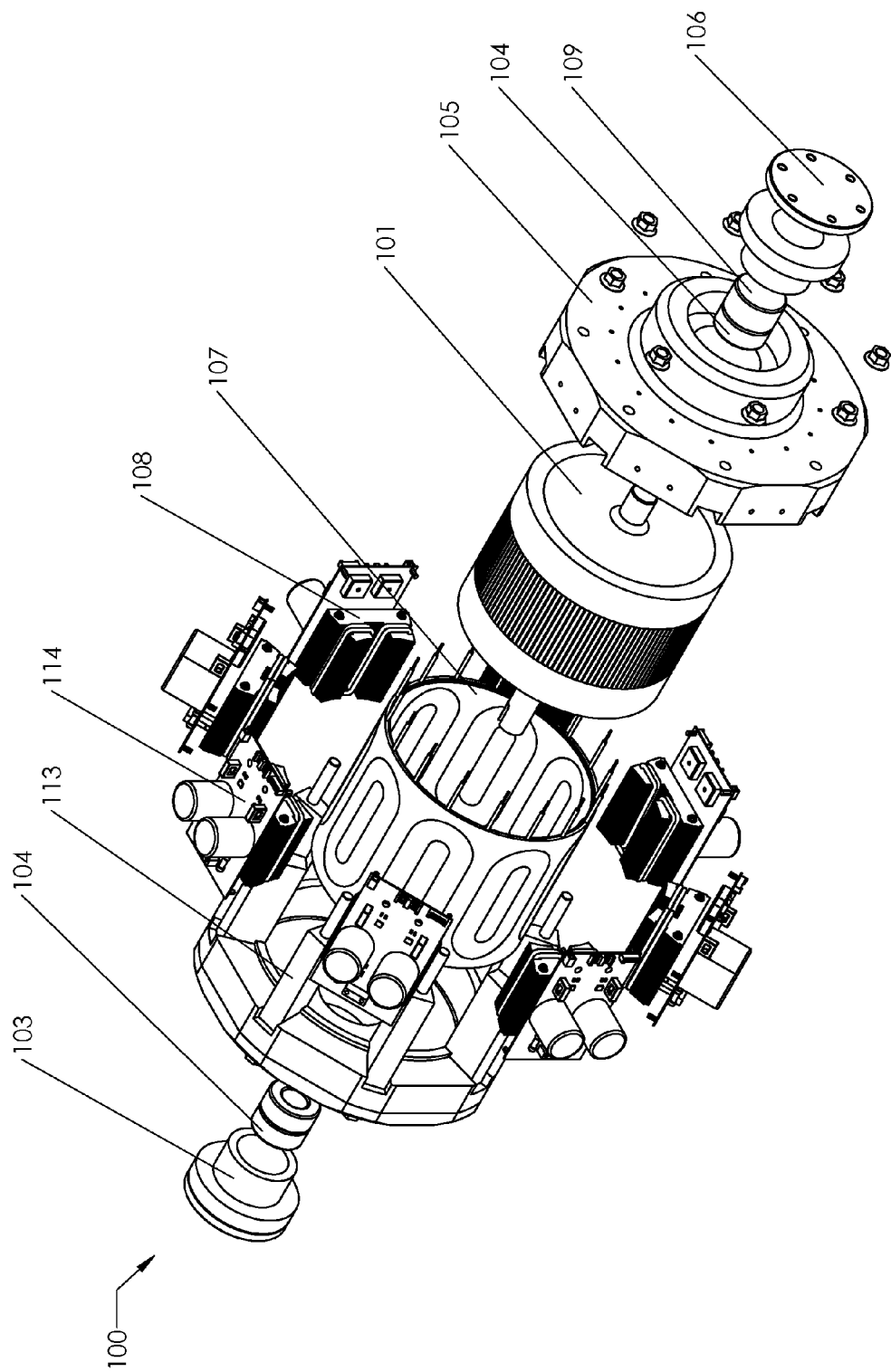
FIG. 3 illustrates an exploded perspective view of the programmable electric converter of FIG. 1.

Referring to FIGS. 1-3 collectively, an embodiment of a programmable electric converter 100 is shown. In the embodiment shown, a rotor 101 having extrusions on either side thereof along an axis of rotation with one shaft extending thru an end plate 106, the rotor being rotatably secured in place via endplates 105 disposed on either side thereof having bearing assemblies (103, 104, 106, 109). Around a circumference of the rotor are disposed a plurality of C-core field coil cells 108 for inducing a magnetic field 110 in the rotor. An armature 107 is disposed between the rotor 101 and the field coil cells 108.

In some embodiments, the axis of rotation of the rotor 101 of the programmable electric converter 100 may be on a horizontal or vertical axis. In operation, the programmable electric converter 100 may use independently controlled field coils 108 to impress a temporary magnetic field 110 on a cylindrical rotor 101 spinning inside one or more armatures 107. These armatures 107 may be comprised of one or more phases. In some embodiments, an armature 107 may be comprised of a total of eight coils totaling sixteen active legs. Any number of armature coils may be used. The eight C-shaped independently controlled field coil cells 108 disposed around the circumference of the rotor 101 have pole faces (PF) that are aligned with each active leg in the armature coils. Electric potential, in such an embodiment, is generated by using closed loop current control of the field coil cells 108 to impart a plurality of temporary north and south magnetic fields to the rotor, wherein the rotation of the rotor produces a DC potential in the armature coils. With both north and south magnetic fields applied to both active legs of each armature coil simultaneously a DC potential is produced in the each armature coil. As the temporary magnetic field strength decays below the desired output voltage the field coils are pulsed again, imparting another plurality of temporary north and south magnetic fields. The magnetic impression(s) are temporary and the dwell time of the impression would be a product of the magnetic properties of the steel rotor 101 and the geometry of the outer ring 101a of the rotor 101. During operation, the magnetic field on an area of the rotor 101 can be reinforced or re-written as needed. Efficiencies can be achieved through the minimizing the magnetic circuit and amount of energized material. Having the ability to independently control which legs are active at which times allows the number of poles on the rotor to be changed dynamically from one (homopolar) to eight. Thus, a universal converter may be achieved, which can operate as an AC, DC or homopolar machine at a wide range of voltages and frequencies by dynamic and selective field coil gating strategies. $n=(120*f)/p$ The programmability of the electro-magnetic converter 100 allows a single machine to be configured for use with any market, whether 480V at 60 Hz, 480 VDC or 400V at 50 Hz, etc. Further, having the ability to dynamically change the number of poles means that when the programmable electric converter is operated as a motor, torque can be controlled independent of the voltage or speed.

In some embodiments, the poles and field currents can be slewed radially around the rotor allowing tolerance in the event of a field coil cell failure. For example, in the event of a failure of one of the field coil cells, the poles can be remapped on the rotor to skip the bad cell. In some embodiments, the failed field coil cell may be replaced with a new cell without having to completely power down the entire system.

Figure 4:
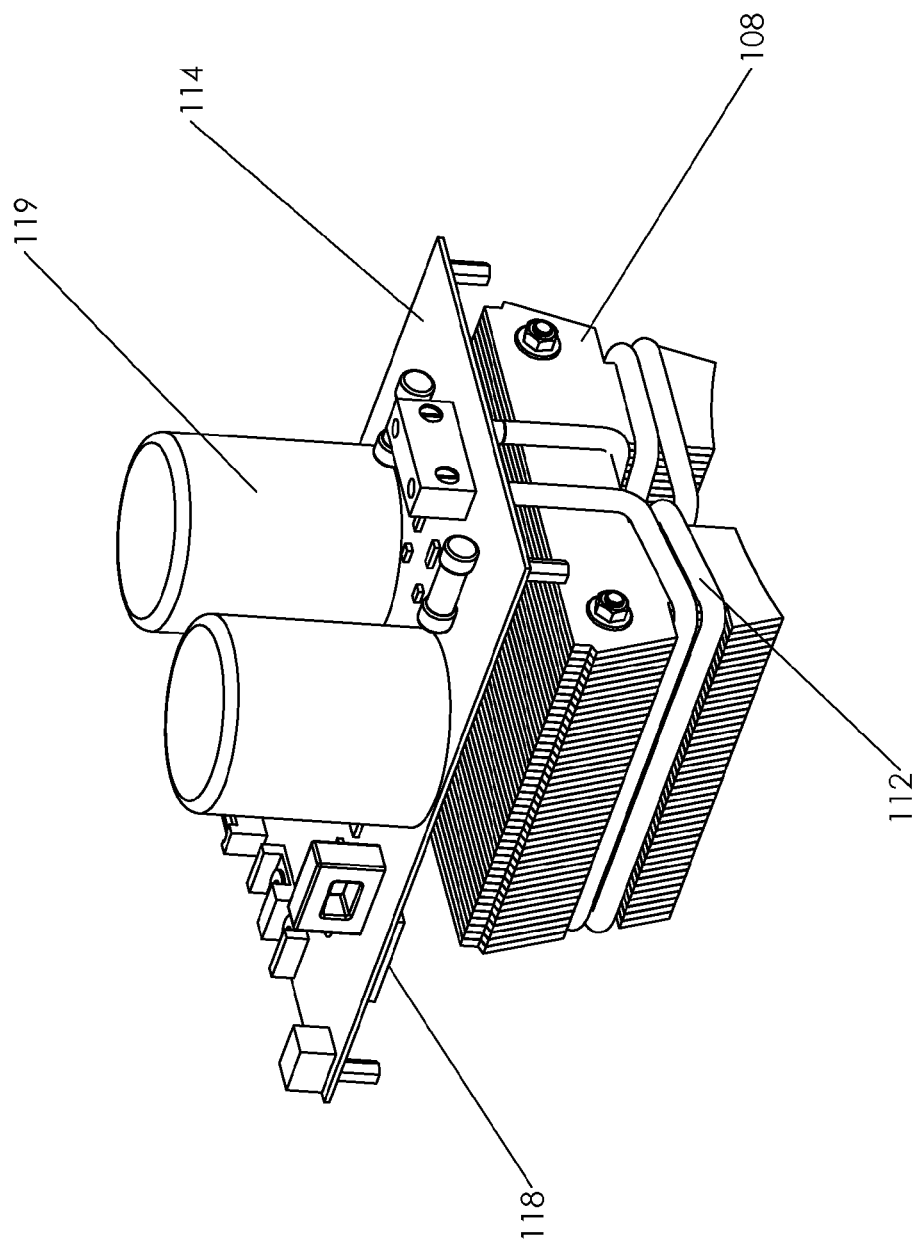
FIG. 4 illustrates a perspective view of a field coil cell of the programmable electric converter of FIG. 1.
Figure 5:
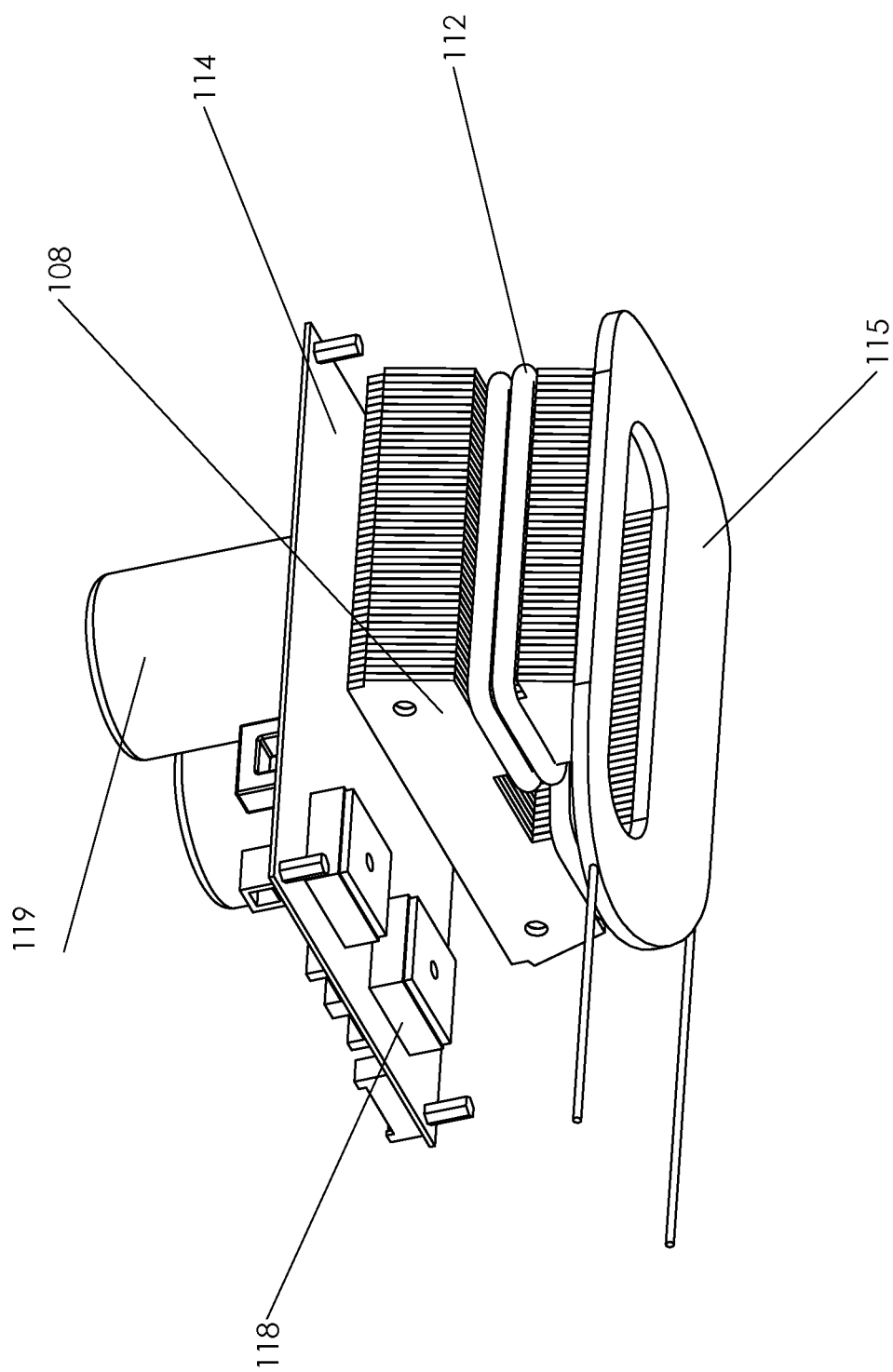
FIG. 5 illustrates another embodiment of the field coil cell of FIG. 4 showing the armature coil integrated into the field coil cell.

Referring to FIG. 4-5, embodiments of C-core type field coil cells are shown. In the embodiment shown, the field coils may be of a laminated steel construction, wherein each C-core field coil cell has two windings therearound, one in series with the other, and wound in such a way that each coil produces flux in the same direction in the c-core. Each winding may be coupled to a separate power supply, such as a DC power source and may have an insulated gate bipolar transistor (IGBT) 118 disposed between the power source and the windings to allow bi-directional control of the current flow through the windings. Using bi-directional IGBTs to independently control the field coils, the electromagnetic converter 100 can pass complimentary magnetic flux thru both legs of any armature coil, in either direction, at any time, allowing among other things output frequency control. Output voltage is control achieved thru closed loop current control of the field coil currents. A benefit of the distributed multi-field coil design is the thermal losses are distributed among a plurality of c-cores and associated IGBTs making it easier to reject the heat. In some embodiments, in addition to the primary energizing coil(s), multiple parallel windings may be included on the field coil laminations, such as a separate motoring winding circuit or a separate magnetic bearing winding or a separate damping circuit. In embodiments where the rotor is disposed within a vacuum, the field coil cells may be disposed outside of the vacuum. In some embodiments, the coils may be force air cooled and the windings may be low-turn, high-current windings providing low impedance and high responsiveness. In some embodiments, the power source may include a capacitor 119 to provide a high discharge. In some embodiments, each field cell or groups of field cells may be coupled to one or more circuit boards 114 for mounting the IGBTs and drivers thereon. In some embodiments individual armature coils 115 may be assembled into the field coil cell 108 for improved servicability of a failed armature coil. In some embodiments the c-cores are made of Metglas, or amorphous metal alloy, with low magnetic losses.

Figure 6:
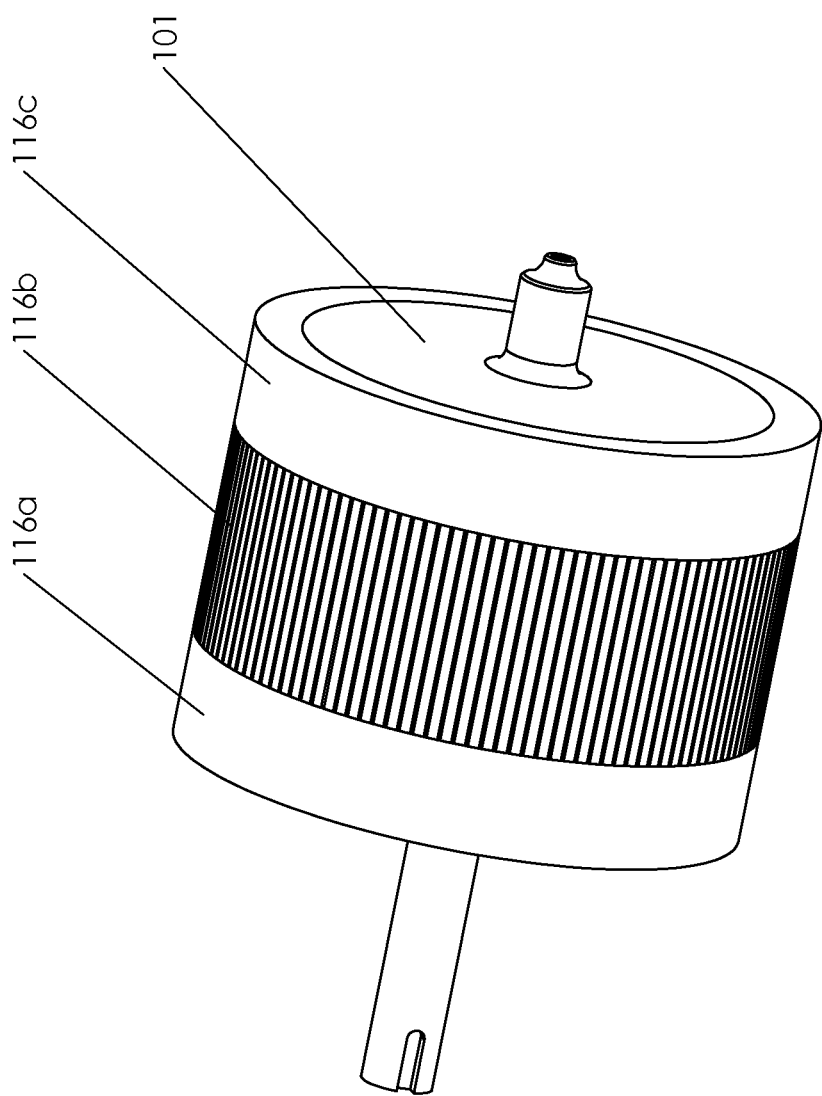
FIG. 6 is a perspective view of the slotted rotor assembly of the programmable electric converter of FIG. 1.
Figure 7:
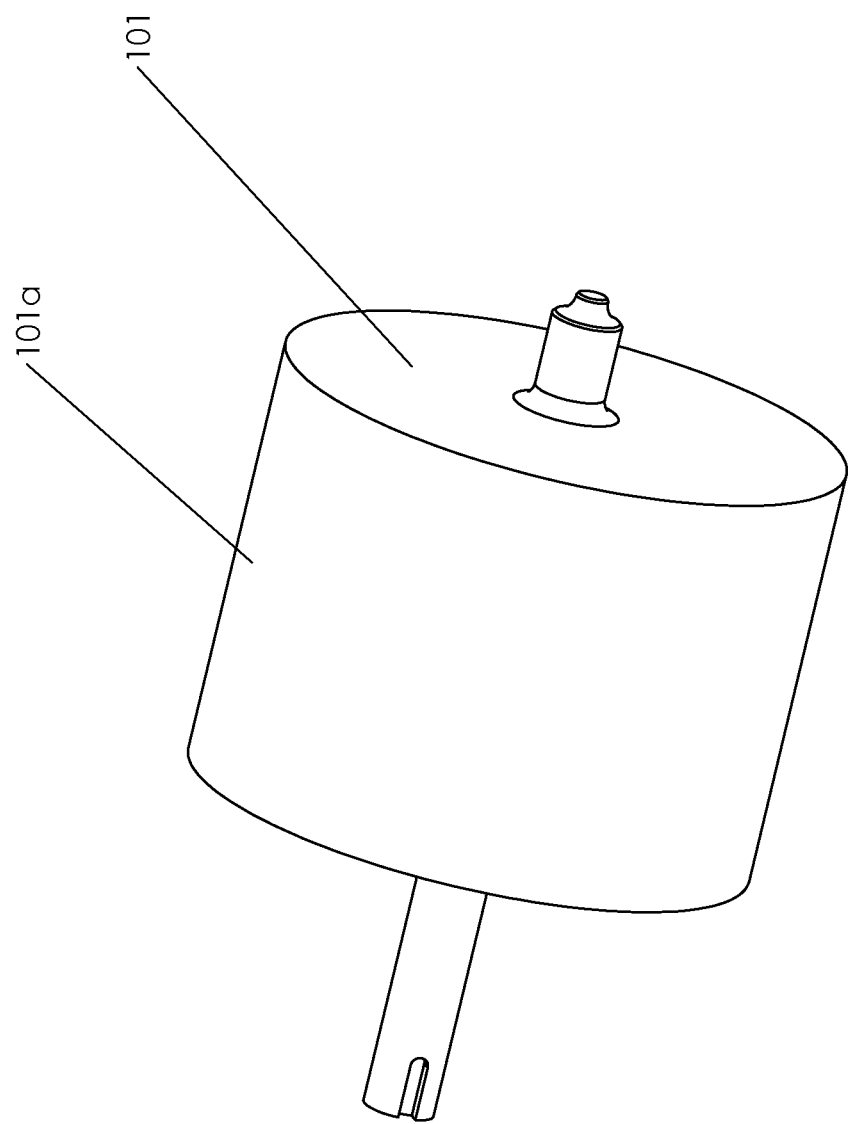
FIGS. 7-8 are views of different embodiment of the rotor of the programmable electric converter of FIG. 1.
Figure 8:
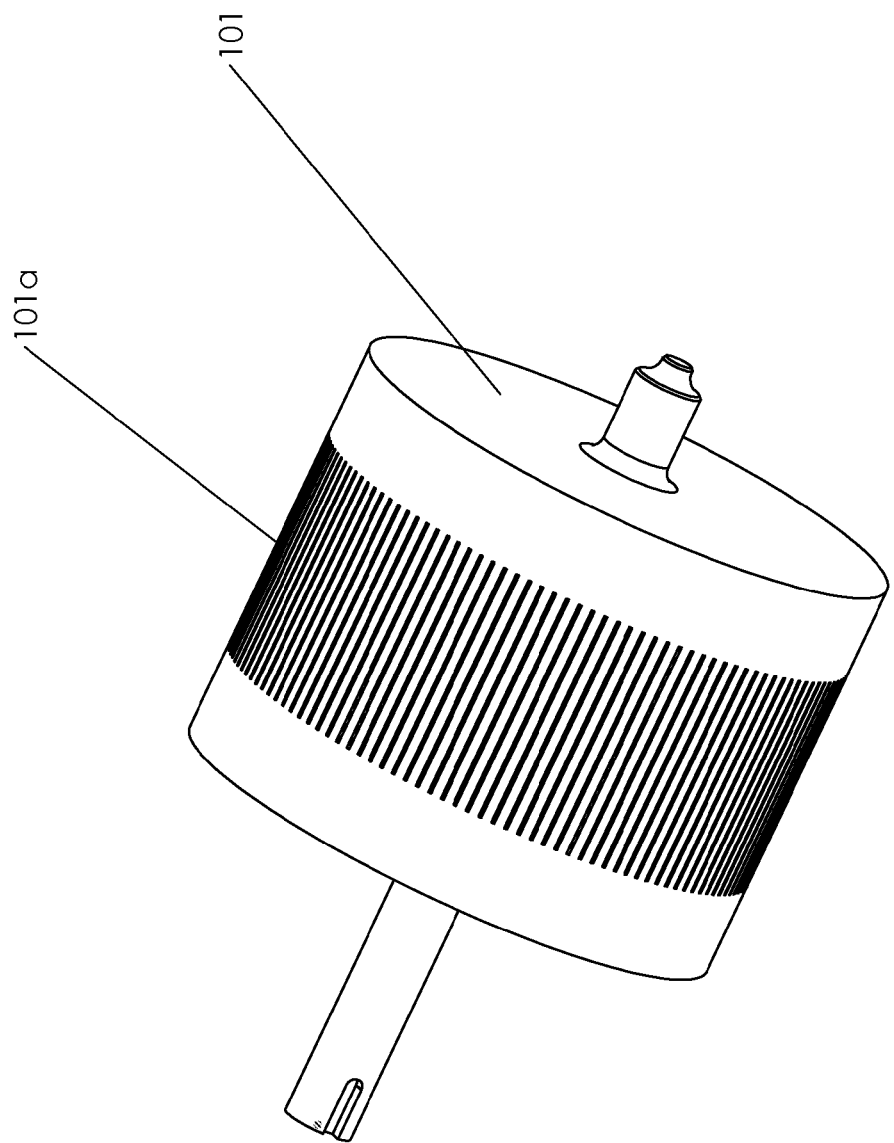

Referring now to FIGS. 6-8, various embodiments of rotors 101 adapted for use in the electro-magnetic converter 100. In some embodiments a composite design having one or more magnetically permeable rings 116b positioned under the active length of the armature coils by a non magnetic mandrel 116a and 116c. This magnetically permeable material may be slotted. These rings may be constructed of laminations to reduce losses. In some embodiments, the rotor may be a generally solid cylinder of monolithic steel design having protrusions on a top and bottom thereof along the axis of rotation. The material of the rotor may be chosen based on its physical properties, including, among others, the density of the material and its magnetic field persistence. In some embodiments, various surfaces of the cylindrical rotor may be manipulated to vary the physical and magnetic properties of the rotor. For example, portions of the top and bottom side walls may be removed to reduce the weight of the rotor without reducing the surface area of the outer circumference of the rotor. In addition, in some embodiments, the rotor may have a void of a certain depth disposed inside the outer circumference of the rotor to form a magnetic break between the outer surface of the rotor and the internal volume of the rotor. In some embodiments, slots may be formed in the outer surface of the rotor 101a to isolate the plurality of magnetic fields being created around the rotor. In some embodiments, the slots may extend the full height of the outer circumference and in some embodiments the slots may extend less than the full height from both the top and bottom surfaces. In some embodiments, the number of slots may be equal to or a multiple of the number of the number of field cell coils disposed around the rotor. In some embodiments, the rotor may include an integrated air pump for evacuating air from within the optional vacuum barrier. In various embodiments, the radius, height, weight, surface geometry, and other properties of the rotor may be manipulated depending on the desired inputs and outputs of the electro-magnetic converter. In some embodiments, the rotor may be of a composite design having magnetizable pads disposed on or near the fingers of the rotor.

In some embodiments, the outer circumference of the rotor may be beveled or chamfered to allow the creation of forces in multiple directions, such as, magnetic thrust bearing forces, and creating differential radial velocities from one end of the armature active length as compared to the other. In some embodiments, one or more upper bearing may be a ball bearing 104 (shown in FIG. 1) adapted to receive a radial load and the lower bearing may include both a ball bearing and a pivot bearing 109 (shown in FIG. 1) for receiving a thrust load. In such embodiments, the pivot bearing is capable of high speed and high thrust and brings the ball bearings into a small diameter, thereby lowering the radial velocities.

Figure 9:
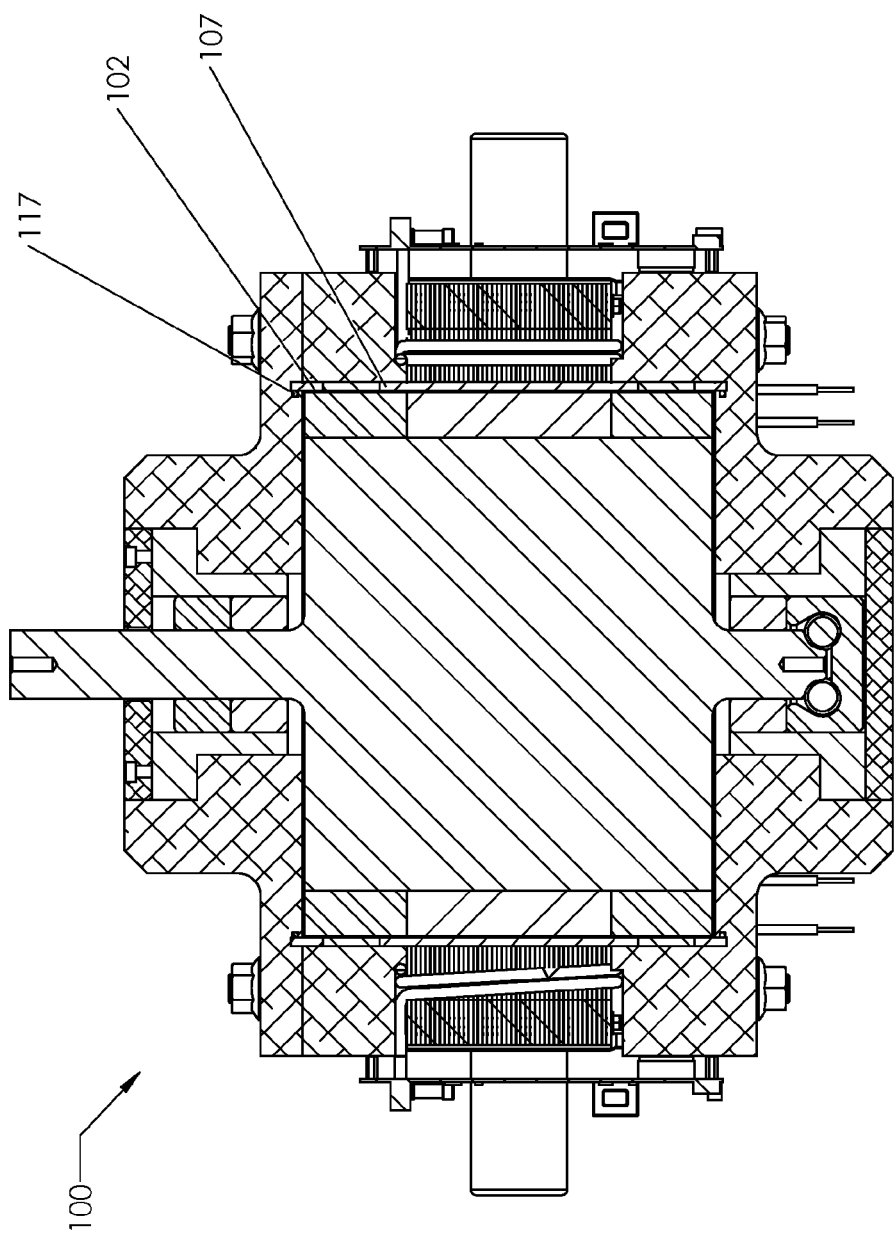
FIG. 9 illustrates how the armature assembly may be used as a vacuum barrier used in an embodiment of the programmable electric converter of FIG. 1.

FIG. 9 illustrates a view showing the optional vacuum barrier 102 applied to the inner diameter of the armature assembly 107 with the associated O-ring 117 seals used to contain the vacuum around the rotor. In some embodiments, such as, for example, high speed applications, wind drag may have a significant deleterious effect and creating a vacuum around the rotor may reduce the wind drag. In general, the vacuum barrier may be formed of a non-magnetic material adapted to minimize interference between the field coils and the rotor. For non-vacuum systems clearances between the rotor and the stator will be minimized to reduce drag.

Figure 10:
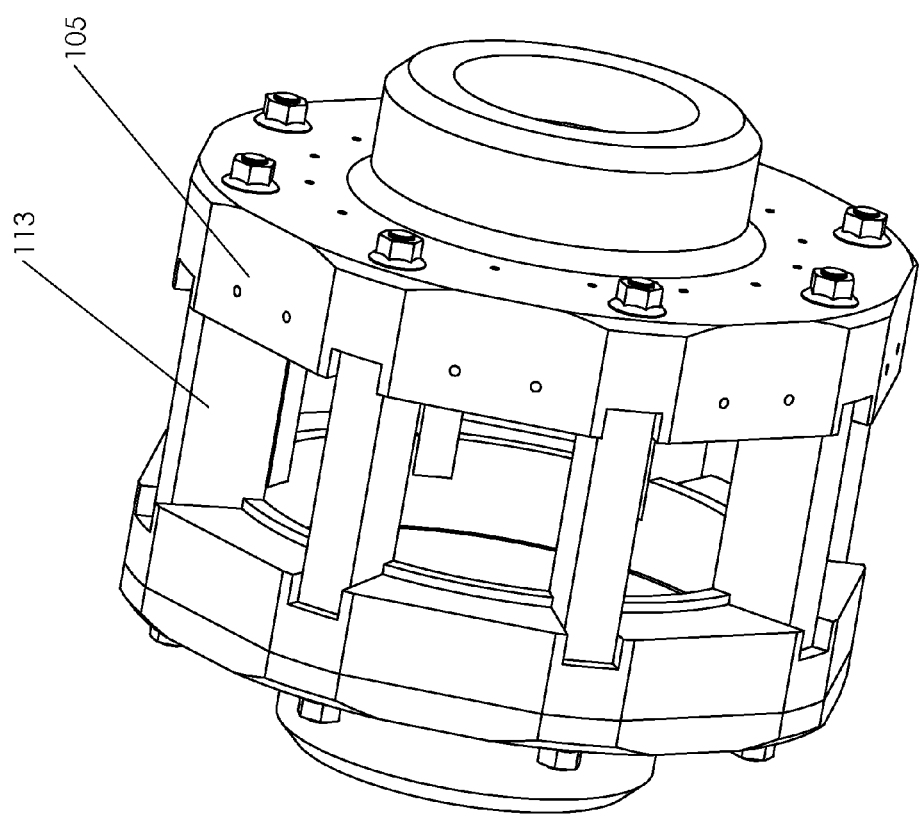
FIG. 10 shows a perspective view of the endplates and spacers forming a frame of the programmable electric converter of FIG. 1.

Referring now to FIG. 10, end plates are adapted to be disposed along the top and bottom surfaces of the rotor, separated by a regular circular pattern of spacers. The spacers are tapered to match the taper on the field coil cells 108 (shown in FIG. 1) such that the high radial magnetic forces created by the field coils are directed into the circumferential structure. The end plates may be formed of a non-magnetic material, such as Aluminum, and may have integrated heat sink features formed therein to remove heat from the coils or switches (IGBTs).

Figure 11:
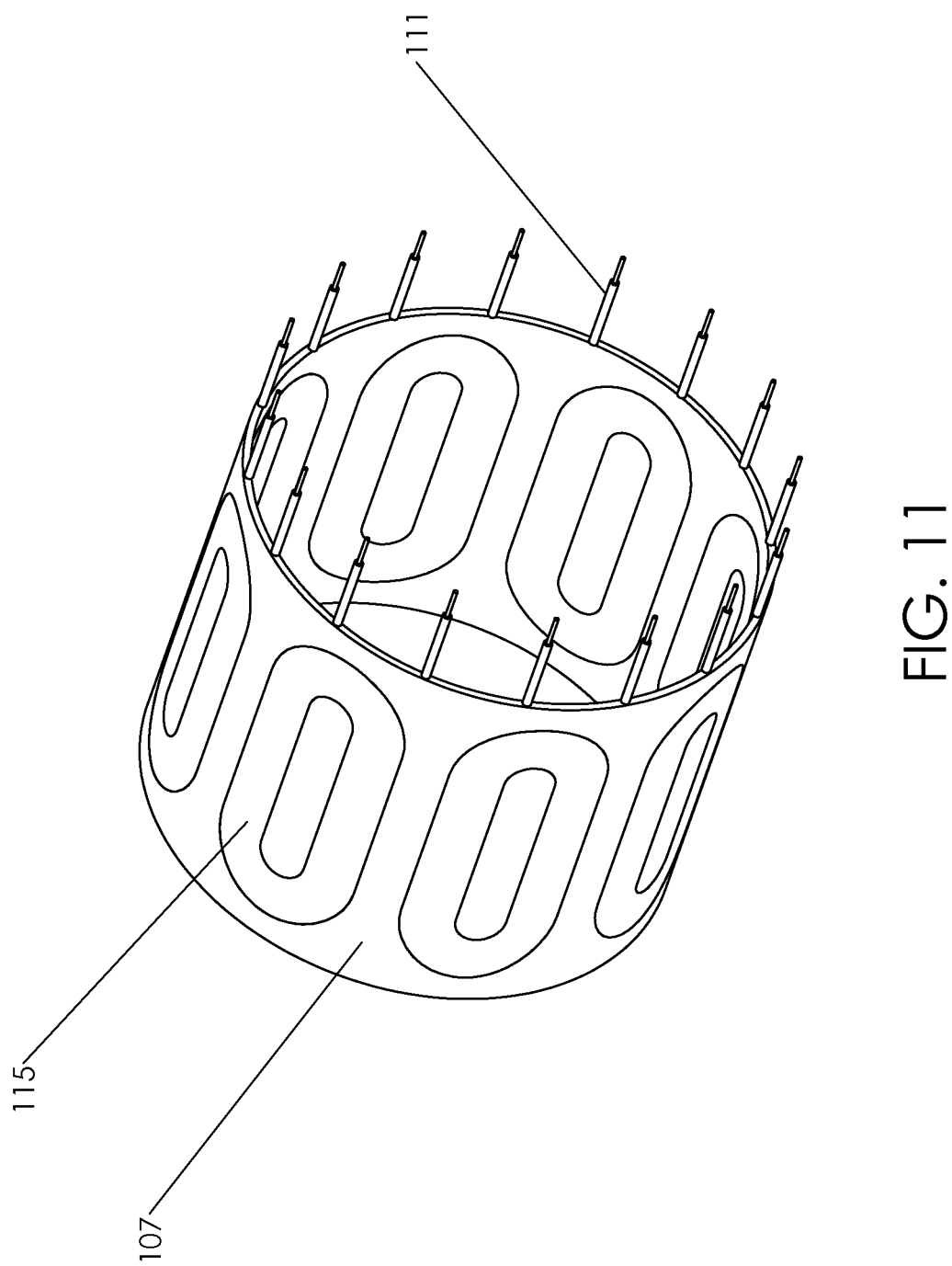
FIG. 11 shows a perspective view of the armature assembly of the programmable electric converter of FIG. 1.
Figure 12:
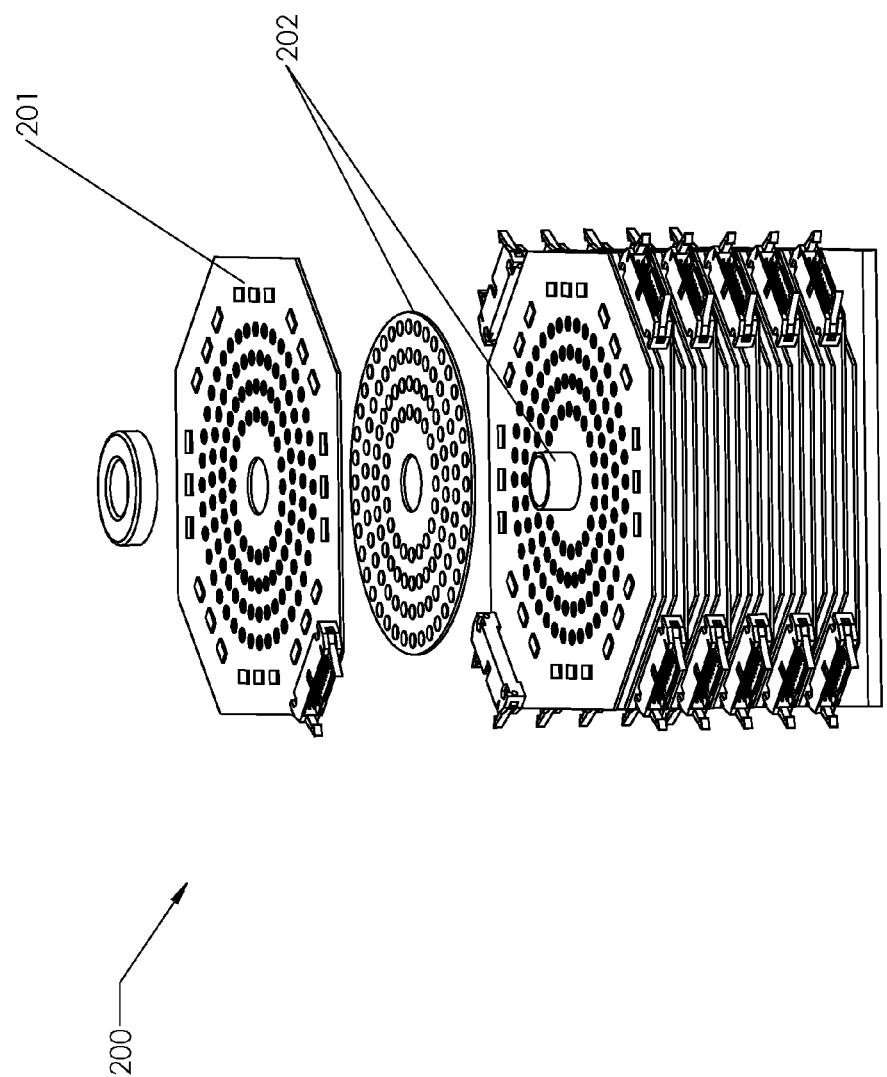
FIG. 12 shows a partial exploded view of a multi-disc embodiment of a programmable electric converter.
Figure 13:
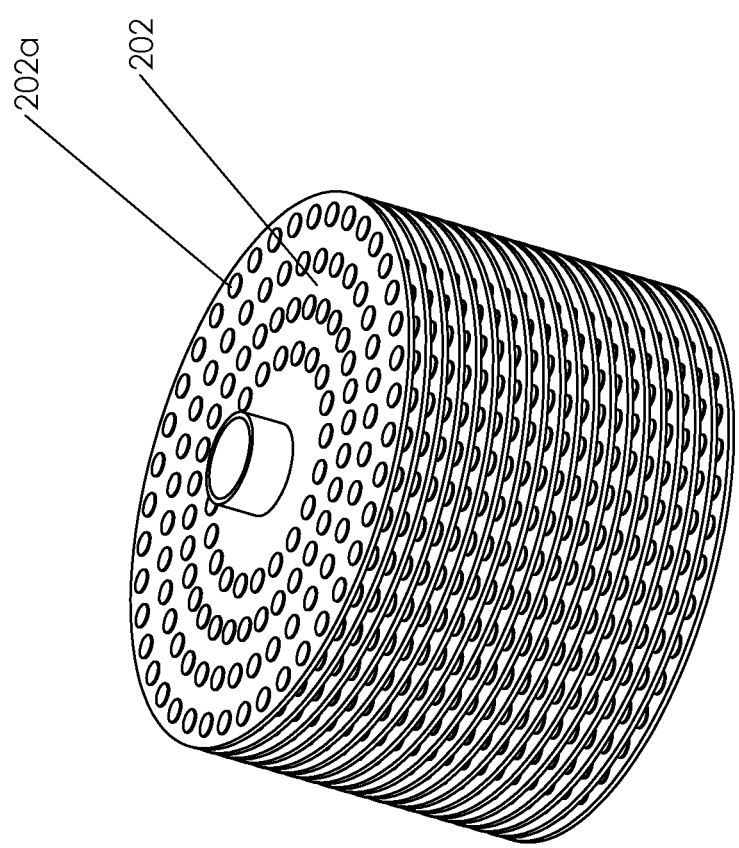
FIG. 13 shows an embodiment of the multi-disc rotor assembly used in a programmable electric converter.
Figure 14A:
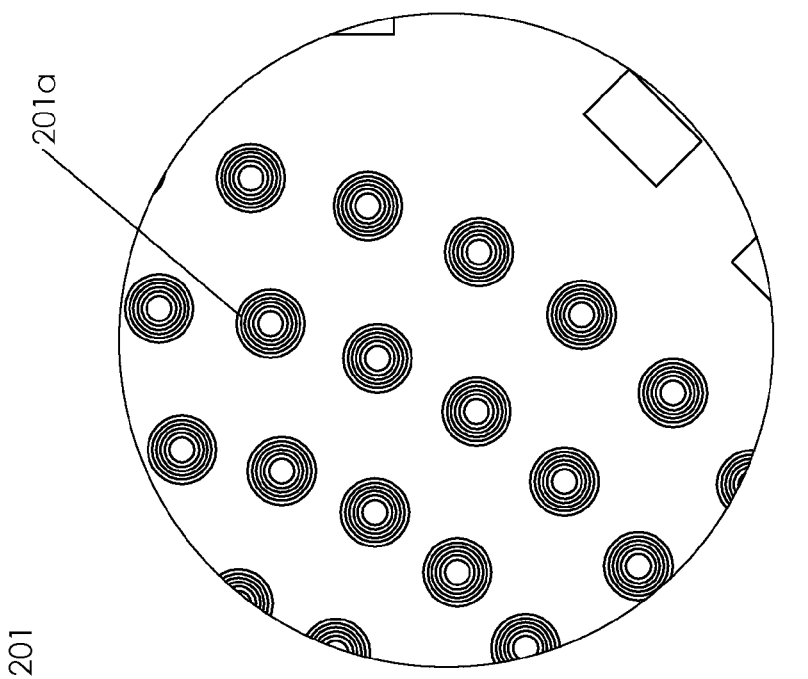
FIGS. 14 and 14A are views of an embodiment of a circuit board having an inductor thereon for use in a multi-disc programmable electric converter.
Figure 14:
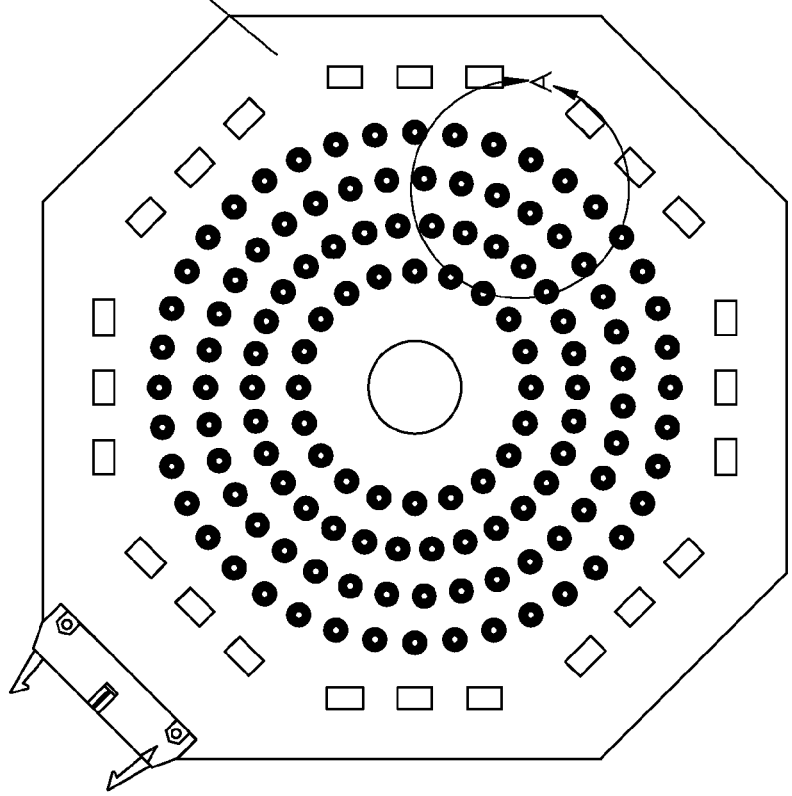
Figure 15:
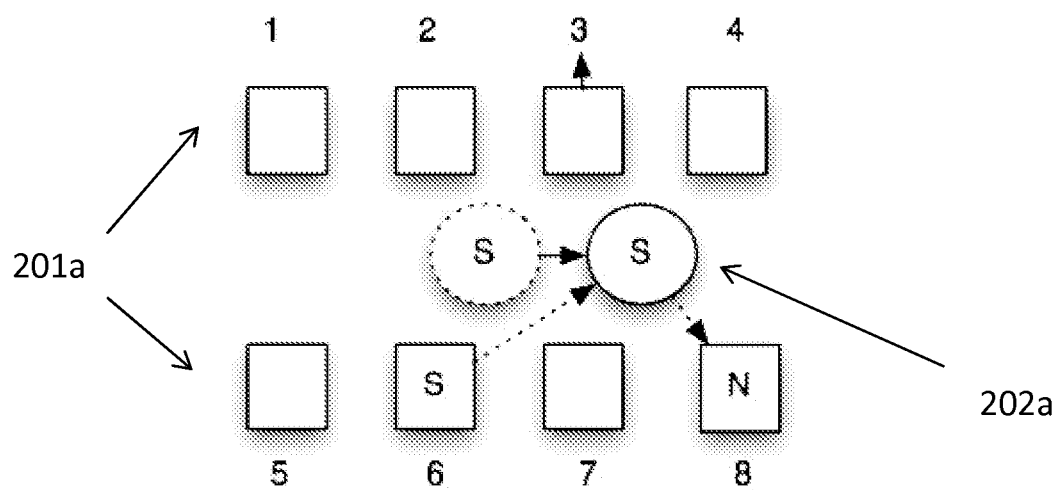
FIG. 15 is a diagram of an embodiment of a multi-disc programmable electric converter in operation.

Referring now to FIG. 11, an embodiment of the cartridge armature assembly 107 used in the programmable electrical converter 100 of FIG. 1 is shown. In various embodiments, the armature may be disposed outside of the vacuum barrier, if applicable. In some embodiments, the armatures may be comprised of one or more phases with a total of eight coils 115 having sixteen active legs per armature. In various embodiments, the number of armature input/output pins 111 could range from two up to a maximum of two times the number of armature coils. Any number of internal busing structures can be employed to group together the common outputs of one or more armature coils. One or more switches may be used on the individual armature coil input and output wires. These switches may be a combination of series, parallel, or anti-parallel switch elements. Armature coils may be optimized for forced convection cooling, using, for example, slot wound or bobbin wound armature coils or Z-form coils.

In various embodiments, the electro-magnetic converter disclosed herein may be adapted for use as a continuous power solution to provide power for a limited period of time in the event of a power outage and/or as a surge protector (by absorbing the energy and storing it mechanically in the rotor). In such embodiments, the shaft may be coupled to an engine-generator set (genset) with a magnetic clutch coupling, which provides a clean slip (i.e., just heat). The inertial energy stored in the spinning rotor may be used to generate the ride-through power to critical loads while also using some of the stored energy to inertial gen-set start prior to transition to an alternative power source, such as a diesel generator. In other embodiments, the ability of the electro-magnetic converter to receive a variable shaft input and provide a regulated frequency and voltage output may allow its use as a generator in a wind turbine. In some embodiments, the electro-magnetic converter may be utilized to provide a traction drive with regenerative energy capture on braking and dynamic rotor damping. In such an embodiment, one or more electro-magnetic converters may be disposed at each wheel of a vehicle. In some embodiments, the electro-magnetic converter may be utilized as a stepper motor with accurate positional control. In some embodiments, two programmable electric converters may be shaft coupled for converting between different frequencies of power, such as, for example, by inputting into one armature from a 50 Hz power supply to motor the rotor and simultaneously generating an output at 60 Hz from the other armature.

In some embodiments, both AC and DC could be simultaneously produced, where AC is generated in one armature coil and DC in another coil. In some shaft coupled embodiments, AC power can be converted to DC power by operating one converter as an AC motor while operating the other as a DC generator. In some shaft coupled embodiments, DC power can be converted to AC power by operating one converter as a DC motor while operating the other as an AC generator. In some embodiments, the programmable electric converter can operate as a DC to DC converter using input shaft torque and DC power of the field coil cells to generate DC power at a higher voltage. In some embodiments, the electro-magnetic converter may be utilized to provide electro-magnetic propulsion in magnetic levitation application to provide precise acceleration profiles and capture regenerative braking energy. In some embodiments, the electro-magnetic converter may be utilized to propel objects by using a repetitive pulse output to power a coil gun or rail gun. In some embodiments, a plurality of electro-magnetic converters as disclosed herein may be distributed throughout an electrical grid to provide step-up and step-down transformation, as needed. In some embodiments, the electro-magnetic converter may be utilized as a motor allowing motor torque to be varied without changing the voltage just by adding or removing coils, the tradeoff being efficiency vs. speed. (Dynamic torque control via programming) When configured as a motor, this device can change direction faster and more smoothly than any other electric motor because it can be segmented into parts with different functions, some using electricity to go forward, some taking energy to make electricity, and some using that same electricity to go backward, with the proportion being varied in real time Referring now to FIGS. 12-15, an embodiment of the electro-magnetic converter is shown in a multi-disc format 200. In this embodiment, a plurality of thin planar disks are disposed along a single shaft 202. On each disk are a plurality of radially-aligned magnetic dots 202a. Disposed above and below each disk is a matrix of electromagnetic coils that can be energized to move the magnetic dots, or that can be influenced by the passage of magnetic dots between the poles of the coils to generate electricity. In other embodiments, a thin disk uniformly magnetized may include a plurality of radially-aligned holes therein. Energizing the coils aligned with a hole would move the disk towards the metal as the magnets attract each other, or the passage of the inner magnetic material between the poles of coils would generate electricity. In some embodiments, the coils 201a disposed between the disks could be very small and, for example, disposed on an integrated circuit 201. These thin-disks could be stacked along the same axis to provide high-density energy conversion, operating at low voltages on the micro level, but able to deliver high current and voltage on the system level. The overall efficiency of an electro-magnetic converter may be related to the proportion of the mass of the device that can be brought into opposition to impel (or respond to) motion. By maximizing the active area where coils and magnetic dots can come into contact, the material costs are minimized for maximum cost effectiveness. Since electromagnetic fields drop off with the square of the distance that implies very close, wide-area contact to minimize radiant energy loss. To avoid magnetic coupling of adjacent cells, the coils may need to operate at low voltages or be spaced more widely. The speed and responsiveness of an electro-magnetic converter is related to the operating voltage used at the coil-to-magnetic-dot interface because it takes some time to generate or take down a magnetic field. Lower voltage operation would allow higher frequency field modulation and hence closer spacing of coils. In some embodiments, magnetic coupling between high-density coils may be reduced by activating alternating rows of coils on a time slicing schedule. In some embodiments, an inductor layout could be made to descend into a multilayer board such that the flux lines on both sides of the inductor board could be used to interact with the magnetic dots, thereby reducing magnetic radiant losses. The printed circuit board could hold the inductor driver, and have connectors that would hook up to a microcontroller or FPGA.

Figure 16:
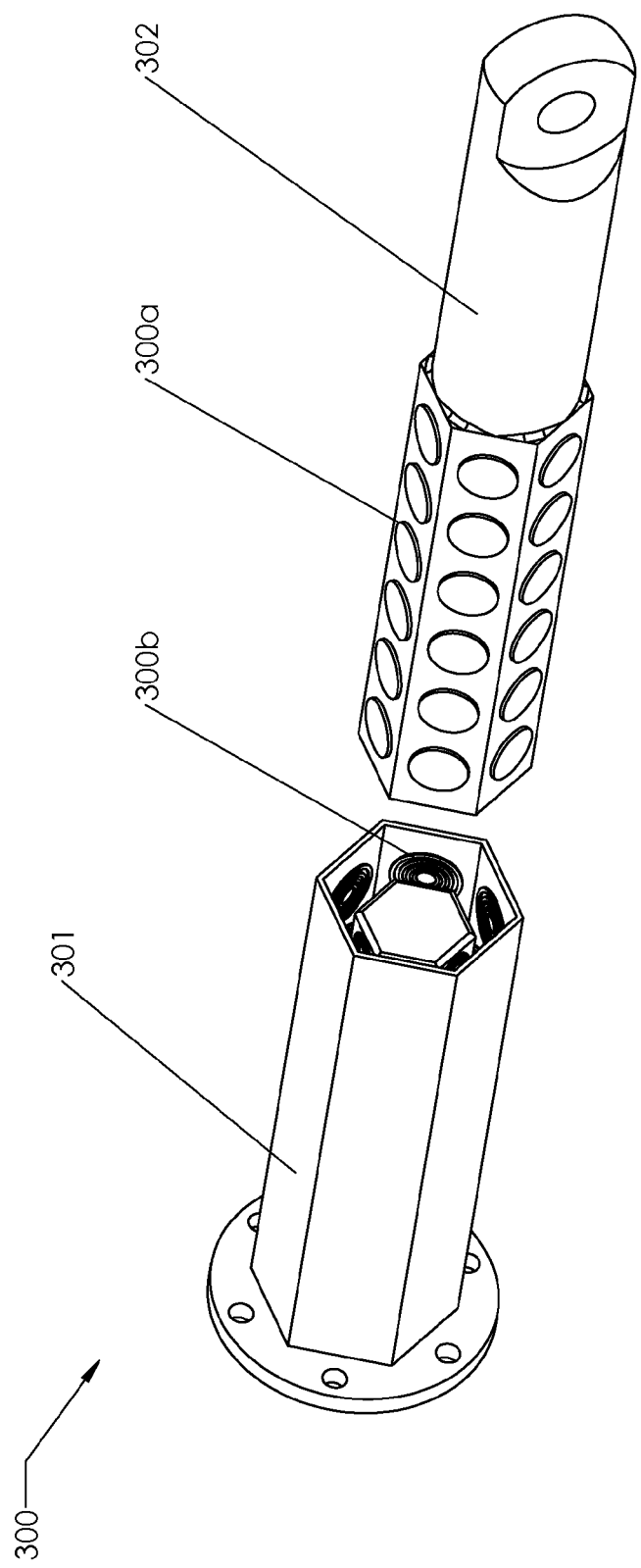
FIG. 16 is an exploded view of an embodiment of a linear programmable electric converter.

Referring now to FIG. 16, an embodiment of the electro-magnetic converter in a linear orientation is shown 300. In this embodiment, the electro-magnetic converter is acting as a solenoid, with the inner hollow rod composed of a linear stack of magnetic dots 300a, oscillating back and forth between coils 300b that either drive the rod or pickup current flow. In some embodiments, an outer rod of coils 300b may be disposed adjacent to an outer surface of magnetic dots 300a and an inner rod of coils 300b may be disposed adjacent an inner surface of magnetic dots 300a. In some embodiments, there may be a fixed magnet or spring at each end to provide restorative force to reset the device for the next cycle. One of the mechanical applications for this type of device might be as a shock absorber in a car where the up and down motions could be used to generate electricity while smoothing out the ride. In some embodiments, the electro-magnetic converter comprises, generally, a programmable coil configuration in an electromechanical transducer. The dispersal of coils enables an assembly of driver/pickup coils to be independently actuated, and the mechanical substrate links the actions of the parts, allowing them to be multiplied into a single electromechanical system with a dynamically alterable function.

In some embodiments, coils and magnetic dots may be embedded into a flexible material and electrical pulses may be used to control the folding of that material, or in the reverse direction, movement of the material could be sensed as electrical pulses to indicate position and orientation of the material. In some embodiments, the electro-magnetic converter may be adapted to be disposed in a running shoe that could generate enough electricity to power blinking safety LEDs or a wireless performance monitor. In other embodiments, a sheet of electro-magnetic converters in a cloth-like form could flap in the wind to generate power. As a programmable electromechanical transducer, the switch/coil/dot unit assembly would be an improvement over the piezoelectric effect in that the properties can vary in time and space, with a subdivision and specialization of function in the same system.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications, and substitutions without departing from the spirit and scope of the invention.

What is claimed is:

1. A programmable electric device, comprising:
   an armature having a first side and a second side, the armature comprising a plurality of armature coils, each armature coil having two active legs and two armature leads coupled thereto;
   a rotor disposed adjacent to the first side of the armature and movable relative thereto, the rotor comprising a magnetizable material operable to have a plurality of distinct temporary magnetic fields impressed therein, each of the plurality of distinct temporary magnetic fields comprising a north pole and a south pole;
   a plurality of field coil cells disposed adjacent to the second side of the armature and proximate to the rotor such that the armature is interposed therebetween, the plurality of field coil cells operable to receive electrical power and be energized to generate magnetic fields therein and thereby impress the plurality of distinct temporary magnetic fields onto the rotor;
   control circuitry coupled to the plurality of field coil cells to control the energization of the plurality of field coil cells, the control circuitry operable to selectively energize one or more of the plurality of field coil cells to dynamically control properties of the plurality of distinct temporary magnetic fields impressed on the rotor, the control circuitry comprising a plurality of control circuits, wherein a control circuit of the plurality of control circuits is coupled to each field coil cell of the plurality of field coil cells to allow each of the field coil cells to be independently controlled;

wherein movement of the rotor relative to the armature causes one or more of the plurality of distinct temporary magnetic fields to generate an electric potential in one or more of the plurality of armature coils; and wherein an electric current flowing in one or more of the plurality of armature coils creates a magnetic field to impart magnetic force on one or more of the plurality of distinct temporary magnetic fields to move the rotor relative to the armature.

2. The programmable electric device of claim 1, wherein:
the control circuitry is operable to vary a magnitude of the magnetic force exerted on the rotor by selectively energizing the plurality of field coil cells to dynamically control the plurality of distinct temporary magnetic fields impressed on the rotor.

3. The programmable electric device of claim 1, wherein:
the armature and the rotor are operable as an AC motor when AC power is supplied to the armature leads to produce a rotating magnetic field in the armature and DC power is supplied to one or more of the plurality of field coil cells to impress the plurality of distinct temporary magnetic fields onto the rotor, the rotating magnetic field exerting the magnetic force on one or more of the plurality of distinct temporary magnetic fields to cause the rotor to move relative to the armature.

4. The programmable electric device of claim 1, wherein:
the armature and the rotor are operable as a DC motor when DC power is supplied to the armature leads and sequentially pulsed to produce a rotating magnetic field in the armature and DC power is supplied to one or more of the plurality of field coil cells to impress the plurality of distinct temporary magnetic fields onto the rotor, the rotating magnetic field exerting the magnetic force on one or more of the plurality of distinct temporary magnetic fields to cause the rotor to move relative to the armature.

5. The programmable electric device of claim 1, wherein:
the armature and the rotor are operable as a DC generator when an input force is applied to the rotor causing the rotor to move relative to the armature and a DC power source is coupled to one or more of the plurality of field coil cells to impress the plurality of distinct temporary magnetic fields onto the rotor, the motion of the rotor relative to the armature producing a DC potential in the plurality of armature coils.

6. The programmable electric device of claim 5, wherein:
the DC potential is controlled by an amplitude of the electric current applied to the field coil cells and a frequency and time of a duty cycle of the field coil cells and a speed of the movement of the rotor relative to the armature.

7. The programmable electric device of claim 5, wherein:
the plurality of distinct temporary magnetic fields persist for a period of time such that the DC potential is produced in a first direction and subsequently in a second direction such that an AC potential is produced at the armature leads of the armature coils.

8. The programmable electric device of claim 5, wherein:
the DC generator is operable as a DC-to-DC power converter.

9. The programmable electric device of claim 1, wherein:
the armature and the rotor are operable as an AC generator when an input force is applied to the rotor causing the rotor to move relative to the armature and a DC power source is coupled to one or more of the plurality of field coil cells to impress the plurality of distinct temporary magnetic fields onto the rotor, the DC power supplied to the field coil cells being bi-directional such that a polarity of the plurality of distinct temporary magnetic fields impressed onto the rotor by the DC power in a first direction can be switch by applying the DC power in a second direction; and the motion of the rotor relative to the armature and the switching of the polarity of the plurality of distinct temporary magnetic fields impressed onto the rotor produces an AC potential in the plurality of armature coils.

10. The programmable electric device of claim 8, wherein:
the AC potential is controlled by an amplitude of the current applied to the field coil cells and a frequency and time of a duty cycle of the field coil cells and a speed of the movement of the rotor relative to the armature.

11. The programmable electric device of claim 1, wherein:
the motion of the rotor relative to the armature is linear.

12. The programmable electric device of claim 1, wherein:
the movement of the rotor relative to the armature is caused by torque forces.

13. A method for utilizing temporary magnetic fields in a programmable electric device operable in multiple modes of operation, the method comprising:

providing a rotor having a magnetizable material on a surface thereof;

providing an armature and a plurality of field coil cells disposed in close proximity to the rotor, the armature having a plurality of armature coils interposed between the rotor and the plurality of field coil cells, each armature coil having two active legs and two armature leads coupled thereto;

coupling the plurality of field coil cells to control circuitry, the control circuitry comprising a plurality of control circuits, wherein a control circuit of the plurality of control circuits is coupled to each field coil cell of the plurality of field coil cells to provide independent control of the field coil cells;

impressing a plurality of distinct temporary magnetic fields onto the rotor by selectively energizing one or more of the plurality of field coil cells to generate magnetic fields therein, the plurality of distinct temporary magnetic fields comprising a north pole and a south pole;

moving the rotor relative to the armature in a first mode of operation to cause the plurality of distinct temporary magnetic fields to generate an electric potential in at least one of the plurality of armature coils; and applying electric power to the at least one of plurality of armature coils to generate magnetic fields therein in a second mode of operation and impart magnetic force on the plurality of distinct temporary magnetic fields to move the rotor relative to the armature.

14. The method of claim 13 and further comprising:
varying a magnitude of the magnetic force exerted on the rotor in the first mode of operation by using the control circuitry to selectively energize the plurality of field coil cells to dynamically control the plurality of distinct temporary magnetic fields impressed on the rotor.

15. The method of claim 13 and further comprising:
wherein the electrical power supplied to the at least one of the plurality of armature coils in the second mode of operation is either AC power or pulsed DC power to produce a rotating magnetic field in the armature; and
controlling a magnitude of the magnetic force imparted on the rotor by using the control circuitry to selectively energize one or more of the plurality of field coil cells to dynamically control the plurality of distinct temporary magnetic fields impressed onto the rotor.

16. The method of claim 13 and further comprising:
varying the electric potential generated in the first mode of operation without changing a speed of the movement of the rotor relative to the armature by using the control circuitry to vary a frequency or an amplitude of the energizing of one or more of the plurality of field coil cells.

17. The method of claim 13 and further comprising:
providing a second armature having one or more armature coils therein adjacent to the rotor such that movement of the rotor relative to the second armature causes the plurality of distinct temporary magnetic fields to generate an electric potential in one or more of the armature coils of the second armature.

18. The method of claim 13, wherein:
the motion of the rotor relative to the armature is linear.

* * * * *